United States Patent
Levy et al.

(10) Patent No.: US 10,460,119 B2
(45) Date of Patent: Oct. 29, 2019

(54) IDPS ACCESS-CONTROLLED AND ENCRYPTED FILE SYSTEM DESIGN

(71) Applicant: Intuit Inc., Mountain View, CA (US)

(72) Inventors: Yaron Levy, Rinatya (IL); Yaron Sheffer, Tel Aviv (IL); Eugene Golovinsky, Palo Alto, CA (US); Luis Felipe Cabrera, Bellevue, WA (US)

(73) Assignee: Intuit Inc., Mountain View, CA (US)

( * ) Notice: Subject to any disclaimer, the term of this patent is extended or adjusted under 35 U.S.C. 154(b) by 384 days.

(21) Appl. No.: 15/054,361

(22) Filed: Feb. 26, 2016

(65) Prior Publication Data

US 2017/0249472 A1    Aug. 31, 2017

(51) Int. Cl.
| | | |
|---|---|---|
| G06F 21/62 | (2013.01) | |
| G06F 21/60 | (2013.01) | |
| H04W 12/08 | (2009.01) | |
| H04L 29/06 | (2006.01) | |

(52) U.S. Cl.
CPC ........ *G06F 21/6218* (2013.01); *G06F 21/602* (2013.01); *G06F 21/6245* (2013.01); *H04W 12/0806* (2019.01); *G06F 2221/21* (2013.01); *G06F 2221/2107* (2013.01); *H04L 63/101* (2013.01)

(58) Field of Classification Search
CPC .......................... G06F 21/602; G06F 21/6218
See application file for complete search history.

(56) References Cited

U.S. PATENT DOCUMENTS

| | | | | |
|---|---|---|---|---|
| 2008/0165957 A1* | 7/2008 | Kandasamy | ........ | G06F 21/6218 380/44 |
| 2012/0304168 A1* | 11/2012 | Raj Seeniraj | ........... | G06F 9/452 718/1 |
| 2013/0198522 A1* | 8/2013 | Kohno | ..................... | G06F 21/62 713/182 |
| 2013/0219176 A1* | 8/2013 | Akella | ................. | H04L 63/0815 713/165 |
| 2014/0359283 A1* | 12/2014 | Lee | ...................... | H04L 67/2852 713/165 |
| 2014/0372771 A1* | 12/2014 | Chuang | ............... | H04L 63/0428 713/190 |
| 2015/0012980 A1* | 1/2015 | Mikolajczyk | ......... | G06F 21/602 726/5 |
| 2015/0372806 A1* | 12/2015 | Carter | .................... | G06F 21/606 713/189 |

(Continued)

*Primary Examiner* — Hosuk Song
*Assistant Examiner* — Sayed Aresh Beheshti Shirazi
(74) *Attorney, Agent, or Firm* — Hawley Troxell Ennis & Hawley LLP; Philip McKay

(57) ABSTRACT

A method and system provides access control encryption for a file system. A resource management module manages access to data on a storage container and hosts a virtual file system including files representing the data on the storage container. An access control and encryption module encrypts each of the files with a respective file encryption key. The access control module generates a plurality of application containers each associated with a respective user and that include respective lists of files that the respective user is authorized to access. The access control and encryption module generates decrypts the files and allows access to files based on the lists of files in the application containers.

39 Claims, 5 Drawing Sheets

(56) References Cited

U.S. PATENT DOCUMENTS

| | | | |
|---|---|---|---|
| 2016/0080474 A1* | 3/2016 | Argenti | H04L 67/10 709/201 |
| 2016/0179557 A1* | 6/2016 | Authement | G06F 3/0664 703/26 |
| 2016/0196442 A1* | 7/2016 | Chapman, III | G06F 21/53 726/29 |
| 2016/0308839 A1* | 10/2016 | Chuang | G06F 21/10 |
| 2017/0177862 A1* | 6/2017 | Narendra Trivedi | G06F 3/0604 |
| 2017/0249469 A1* | 8/2017 | Goyal | G06F 21/62 |

* cited by examiner

IDPS ACCESS-CONTROLLED AND ENCRYPTED FILE SYSTEM DESIGN

BACKGROUND

Data security is rapidly becoming the most important, and potentially limiting, factor in the field of data processing. While the emergence of portable data, "cloud computing," and other forms of distributed data processing and data sharing have the potential to provide truly revolutionary and paradigm shifting advances in human activity, the current inability to provide adequate levels of data security has prevented the realization of the full potential of these advances and capabilities.

Currently, many applications, individuals, and user entities, require access to data that is ultimately stored in one or more physical and/or virtual data source devices, herein referred to as storage containers. Storage containers often include sensitive data representing very sensitive information such as financial and identification information. Consequently, before allowing any applications, entities, and/or individuals access to data contained in storage containers, it is highly desirable that the data be made as secure as possible.

To this end, vast amounts of time, energy, and resources have historically been devoted to security measures for securing data in storage containers. One common current approach to securing sensitive data is to encrypt the data in the storage container. However, currently, an entire storage container, or data source, is typically encrypted with a single encryption key. This type of encryption is referred to herein as "full disk" or "whole disk" encryption.

As noted, using full disk encryption, all the data in an entire storage container is encrypted using a single encryption key. While this approach is arguably efficient in terms of the time, energy and resources required to provide the encrypted data, full disk encryption has several long standing and well known drawbacks. First, using full disk encryption, once the encryption key is determined, and/or the data is accessed by other means, all the data in the storage container is then accessible. That is to say, using full disk encryption, once an unauthorized party or entity finds a way to access any data in the storage container, all data in the storage container becomes accessible and once the data is unlocked (decrypted) any user can potentially access all of the data in the data store. Thus, using full disk encryption, a single security breach can provide a malicious actor access to all of the data in the entire storage container.

An additional drawback to full disk encryption is that a privileged user, such as an administrator, root user, or other special permissions user can easily and even accidentally obtain access to sensitive data. In typical systems, giving a privileged user the ability to properly administrate the system automatically gives the privileged user access to sensitive data stored in storage containers, regardless of whether there is a need, or even explicit authorization, to access the sensitive data. While privileged user status is often necessary in various computing environments, it is also desirable to limit the privileged user's ability to access sensitive data.

As noted, despite these long standing technical problems with full disk encryption methods, full disk encryption is still the most widely used storage container/data source encryption method. This is primarily due to the fact that, currently, methods and systems for providing better encryption and access controls for storage containers and data sources have proven elusive, inefficient, and often ineffective.

What is needed is a technical solution to the long standing technical problem of providing enhanced security and access controls to data in storage containers/data sources that is effective and can be efficiently implemented in existing architectures and operating systems.

SUMMARY

Embodiments of the present disclosure address some of the shortcomings associated with current storage container security schemes by providing methods and systems that provide access control and enhanced encryption for file systems. Embodiments of the present disclosure address the drawbacks of typical storage container security schemes by providing an access control and encryption module, according to one embodiment. The access control and encryption module provides the twin functions of access control and enhanced encryption in order to provide robust security to file systems. Consequently, embodiments of the present disclosure provide a technical solution to the long standing technical problem of providing enhanced security and access controls to data in storage containers/data sources that is effective and can be efficiently implemented in existing architectures and operating systems.

In one embodiment, a storage container is implemented on one or more physical or virtual memory devices/data sources. A resource management module manages one or more storage containers as well as other resources such as processing devices and peripheral devices. The resource management module controls access to the one or more storage containers or other types of physical or virtual storage. The resource management module hosts a virtual file system that includes a plurality of directories, folders, and files representing the data stored in the one or more storage containers. The access control and encryption module encrypts every file in the virtual file system with a respective file encryption key. The access control and encryption module generates a plurality of application containers each associated with a respective user. Each application container includes a list of files and processes that the user is authorized to access. When a user or user associated application attempts to access a selected file in the virtual file system, the access control and encryption module checks to see if the selected file is found in the application container associated with the user. If the selected file is found in the list of authorized files in the application container, then the access control and encryption module decrypts the file and provides it to the user or the user associated application. If the selected file is not found in the list of authorized files in the associated application container, then the access control and encryption module denies the user access to the selected file.

In one embodiment, because each file of the file system is encrypted with a unique encryption key, and because each user is authorized to access only a certain segment of the file system, if a fraudster gains access to a user account, only that segment of the file system that is associated with the user is at risk of exposure. Not only is access to other segments of the file system denied, but each file is encrypted with a unique encryption key. This greatly enhances the security of sensitive data.

In one embodiment, an additional benefit of the access control and encryption module is that a privileged user such as an administrator or root user is impeded from accessing sensitive data. In one embodiment, each application container includes a respective set of rules that governs who can access the data associated with the application container. The rules can include denial of access to the privileged user. Thus, while it may still be possible for a privileged user with sinister intentions to eventually access the sensitive data, the privileged user is greatly impeded in accessing the sensitive data. This can essentially eliminate the possibility that the privileged user could accidentally view sensitive data.

In one embodiment, a computing system implements a method for providing access control and file encryption for a file system. The method includes providing a storage container, the storage container including data. In one embodiment, a virtual file system is provided, the virtual file system including a plurality of files. In one embodiment, the files represent subsets of the data in the storage container.

In accordance with one embodiment, two or more application containers are defined, each of the application containers including a list of processes mapped to a set of one or more files of the plurality of files in the virtual file system. In accordance with one embodiment, for each application container, privileged user access rules are defined, the privileged user access rules controlling access to the one or more files in that application container by privileged users. In one embodiment, privileged user access rules data is generated representing the defined privileged user access rules. In one embodiment, for each application container, an application key specific to that application container is assigned to the application container.

In one embodiment, the method further includes, for each file associated with an application container, assigning a file encryption key specific to that file. In accordance with one embodiment, for each file encryption key, file specific encryption key data is generated representing respective file encryption keys. In accordance with one embodiment, the file encryption key data is encrypted for each file. In accordance with one embodiment, for each application container, the data in each of the files of the virtual file system associated with that application container is encrypted with the specific file encryption key data representing the file encryption key specific to that file.

In one embodiment, the method also includes receiving a request for access to data in a virtual file by a user and determining the process associated with the request for access to data in a virtual file by the user application. In accordance with one embodiment, a determination is made as to whether the process is mapped to the virtual file in the application container containing the requested data. In accordance with one embodiment, if the process is mapped to the virtual file in the application container containing the requested data, the privileged user access rules data is accessed to determine if the user can be denied access to the requested virtual file in the application container containing the requested data. In accordance with one embodiment, if the process is mapped to the virtual file in the application container containing the requested data, and the user cannot be denied access to the requested virtual file in the application container containing the requested data, the specific file encryption key data for the virtual file containing the requested data is decrypted and the decrypted specific file encryption key data for the application container containing the requested data is used to provide the user access to the requested data.

Principles of the disclosure can be extended to data management systems other than files systems. For example, in one embodiment a resource management module hosts a data management system that manages data entities stored in one or more storage containers. In one embodiment data entities can include data objects, files, or other data structures. In one embodiment, a data access and encryption module allows a user or process to access only those data entities associated with that user or process.

Embodiments of the present disclosure address some of the shortcomings associated with traditional data protection schemes that do not adequately secure sensitive data stored in a file system. A computing system in accordance with one or more embodiments provides confidence to individuals and organizations by providing enhanced security for storage containers. The various embodiments of the disclosure can be implemented to improve the technical fields of user experience, data security, and data processing. Therefore, the various described embodiments of the disclosure and their associated benefits amount to significantly more than an abstract idea. In particular, by providing both access control and enhanced encryption, individuals and organizations can save money and time and can better secure their sensitive data.

Using the disclosed embodiments of a method and system for providing access control and enhanced encryption for a file system, a method and system for providing access control and enhanced encryption for a file system more accurately is provided. Therefore, the disclosed embodiments provide a technical solution to the long-standing technical problems of securing sensitive data against unauthorized users and privileged users by providing an access control and encryption module that provides both access control and enhanced encryption for file systems.

In addition, the disclosed embodiments of a method and system for providing access control and enhanced encryption for a file system are also capable of dynamically adapting to the needs of individuals and organizations that operate file systems with sensitive data. Consequently, the disclosed embodiments of a method and system for providing access control and enhanced encryption for a file system also provide a technical solution to the long standing technical problem of static and inflexible data protection schemes.

The result is a much more accurate, adaptable, and robust, method and system for providing access control and enhanced encryption for a file system, that serves to bolster confidence in storage container security methods and systems. This, in turn, results in: less human and processor resources being dedicated to defending against security threats because more accurate and efficient security measures can be implemented, i.e., fewer processing and memory storage assets; less memory and storage bandwidth being dedicated to buffering and storing data security systems and processes; and less communication bandwidth being utilized to transmit data security software and information for analysis.

The disclosed method and system for providing access control and enhanced encryption for a file system does not encompass, embody, or preclude other forms of innovation in the area of data security. In addition, the disclosed method and system for providing access control and enhanced encryption for a file system is not related to any fundamental economic practice, fundamental data processing practice, mental steps, or pen and paper based solutions, and is, in fact, directed to providing solutions to new and existing problems associated with data security systems. Consequently, the disclosed method and system for providing access control and enhanced encryption for a file system, does not encompass, and is not merely, an abstract idea or concept.

Figure 1:
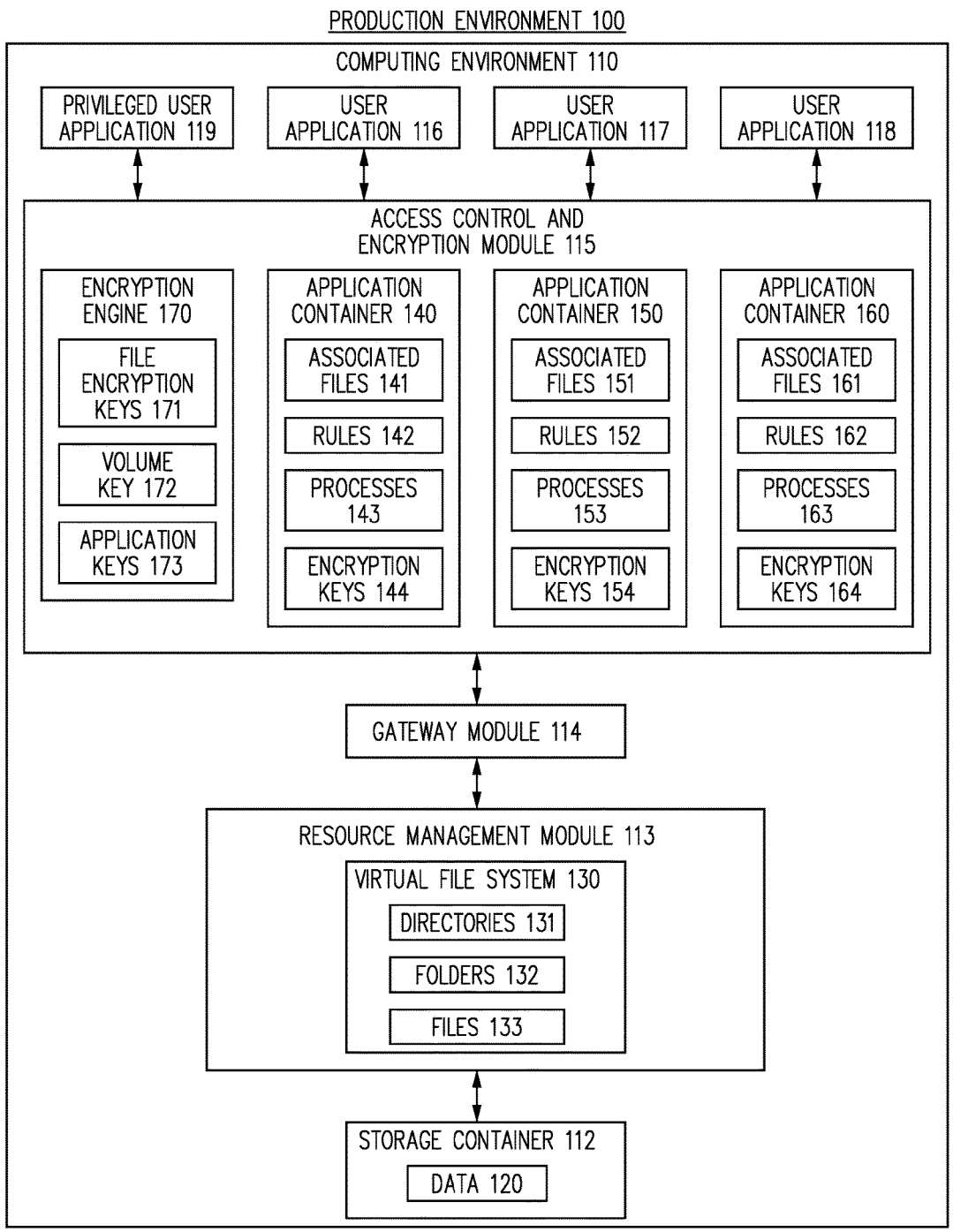
FIG. 1 is a block diagram of software architecture for providing access control and enhanced encryption for a file system, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed system and method for providing access control and enhanced encryption determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

As used herein, the term storage container includes, but is not limited to, any physical or virtual data source or storage device. For instance, in various embodiments, a storage container can be, but is not limited to, one or more of a hard disk drive, a solid state drive, an EEPROM, an optical disk, a server, a memory array, a database, a virtual database, a virtual memory, a virtual data directory, or other physical or virtual data sources.

As used herein, the term application container includes, but is not limited to, one or more profiles or other data sets that allow users and processes to access only particular data within a file system related to a storage container. For instance, in various embodiments, an application container can include, but is not limited to, a set of rules, a list of files, a list of processes, and/or encryption keys that provide access control to a file system such that a user associated with the application container can only access data, files, objects or other portions of a file system in accordance with the set of rules, the list of files, the list of processes, and/or encryptions keys.

As used herein, the term file includes, but is not limited to, a data entity that is a sequence of bytes that can be accessed individually or collectively.

As used herein the term data object includes, but is not limited to, a data entity that is stored and retrieved as a whole, or in large chunks, rather than as a sequence of bytes.

Hardware Architecture

FIG. 1 illustrates a block diagram of a production environment 100 for providing access control and enhanced encryption for a file system, according to one embodiment. Embodiments of the present disclosure provide methods and systems for providing access control and enhanced encryption for a file system, according to one embodiment. In particular, embodiments of the present disclosure provide an access control and encryption module that provides enhanced security for a file system. By providing both data access control and enhanced security, the confidence of individuals and organizations in the security of their storage containers is increased.

In addition, the disclosed method and system for providing access control and enhanced encryption for a file system provides for significant improvements to the technical fields of electronic transaction data security, data processing, data management, and user experience.

In addition, as discussed above, the disclosed method and system for providing access control and enhanced encryption for a file system provides for the processing and storing of smaller amounts of data related to security systems, i.e., fewer security systems are needed and less effective security measures can be discarded; thereby eliminating unnecessary data analysis and storage. Consequently, using the disclosed method and system for providing access control and enhanced encryption for a file system results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for providing access control and enhanced encryption for a file system.

The production environment 100 includes a computing environment 110. The computing environment 110 includes a storage container 112, a resource management module 113, a gateway module 114, an access control and encryption module 115, user applications 116 to 118, and a privileged user application 119. The various components of the computing environment 110 are coupled together by one or more physical or virtual communication channels, according to one embodiment.

The computing environment 110 represents one or more computing systems such as a server, a computing cabinet, and/or distribution center that is configured to receive, execute, and host one or more data storage and access systems, according to one embodiment. The computing environment 110 represents a traditional data center computing environment, a virtual asset computing environment (e.g., a cloud computing environment), or a hybrid between a traditional data center computing environment and a virtual asset computing environment, according to one embodiment.

In one embodiment, the storage container 112 stores data 120. The storage container 112 can include one or more servers, hard disk drives, solid-state drives, or other physical or virtual storage devices/data sources.

In one embodiment, the resource management module 113 manages direct access to the data 120 in the storage container 112. The data 120 stored on the storage container 112 can include data related to the operation of one or more computing systems or peripheral devices that can be operatively connected to the one or more computing systems. If such data is damaged, deleted, or altered there can be serious ramifications to the functionality of the one or more computing devices or peripheral computing devices. In some cases the computing systems or devices can become defective or entirely nonfunctional.

Furthermore, the data 120 can include sensitive personal data, confidential business data, or other kinds of sensitive data whose access should be restricted and whose loss would be highly detrimental to individuals or organizations. Thus, any access to the storage container 112, whether to read data, erase data, or write data must be carefully managed. The resource management module 113 manages direct access to the storage container 112.

In one embodiment, in order to protect the integrity of the data 120 in the storage container 112, the resource management module 113 hosts a virtual file system 130. The virtual file system 130 can be hosted in a physical or virtual memory device mounted to the storage container 112 through the resource management module 113. The virtual file system 130 includes directories 131, folders 132, and files 133 that represent the data 120 stored in the storage container 112. The files 133 can include resources, groups of objects, subsets of the data 120, or other data structures.

As will be explained in more detail below, when a user application or process seeks to access the data 120 in the storage container 112, in actuality the user application or process interacts with the virtual file system 130 that includes all or part of the data 120 organized in the directories 131, folders 132, files 133. In this way, the resource management module 113 prevents direct access to the storage container 112 by hosting the virtual file system 130.

In one embodiment, the resource management module 113 is the kernel of an operating system associated with one or more computing systems of the computing environment 110. In one embodiment, the computing environment 110 utilizes a Linux operating system. In this case, the resource management module 113 is the Linux kernel. In one embodiment, the computing environment 110 can utilize a Microsoft Windows operating system, in which case the resource management module 113 can include Microsoft Windows kernel. In one embodiment, the computing environment 110 utilizes a Macintosh OS X operating system and the resource management module 113 is an OS X kernel such as XNU. The resource management module 113 can include monolithic kernels, micro kernels, hybrid kernels, nanokernels, exokernels or other types of kernels suitable for managing the storage container 112. In one embodiment, the memory management module 113 is a hypervisor, a virtual machine monitor, or a collection of device drivers.

In one embodiment, the resource management module 113 includes a plurality of system calls. The system calls cause the resource management module 113 to perform requested actions on the virtual file system 130 and/or the storage container 112. The system calls can include close, open, read, wait, and write. The system calls can allow access to the virtual file system 130.

In one embodiment, the gateway module 114 enables access to the resource management module 113 and the virtual file system 130 by user applications of the computing system. User applications can communicate with the virtual file system 130 via the gateway module 114. The gateway module 114 protects the resource management module 113 from being directly manipulated by user applications. Because the resource management module 113 performs system critical operations it is desirable to limit direct access to the resource management module 113 by user applications or processes. Thus, the gateway module 114 is an intermediary between the resource management module 113 and user applications that wish to access the virtual file system 130.

In one embodiment, the gateway module 114 is a file system in userspace (FUSE) module. The FUSE module enables non-privileged users to create file systems without editing kernel code. This can be accomplished by running file system code in user space while the FUSE module provides only a bridge to the actual kernel interface.

In typical systems, in order to prevent the reading of sensitive data from the virtual file system 130 or the storage container 112, data encryption techniques are employed. In the prior art, this included encrypting the entire storage container 112 with a single encryption key. Such encryption is termed full disk encryption. One problem with full disk encryption is that there are no access controls on this type of encryption. Once the data is unlocked (decrypted) any user can access all of the data on the disk. Thus, a single security breach can yield all of the data on the entire disk accessible by the fraudster or other malfeasant. There is further risk in that a privileged user, such as an administrator, root user, or other user can easily and even accidentally view sensitive data. Organizations typically employ such an administrator or root user in order to properly maintain the computing system. Nevertheless, the organization may not wish the privileged user to view sensitive data. In typical systems, the problems of full disk encryption, and easy access to sensitive data by the privileged user, are totally unanswered.

A computing system in accordance with principles of the present disclosure addresses these drawbacks by providing the access control and encryption module 115, according to one embodiment. The access control and encryption module 115 enhances the security of the computing system by providing and intertwining the twin functions of access control and enhanced encryption. The access control and encryption module 115 restricts access to the directories 131, folders 132, and files 133 of the virtual file system 130 to particular users, processes, or applications of the computing system. In particular, the access control encryption module 115 segments the virtual file system 130 in such a way that each individual file 133, folder 132 and/or directory 131 is associated with one or more users and/or processes. If a particular file 133 is not associated with a particular user, user application, or process, then that user, user application, or process cannot access that particular file.

Additionally, the access control and encryption module 115 employs enhanced encryption of the files 133. In particular, the access control and encryption module 115 encrypts each file 133 individually with a unique file encryption key represented by unique file encryption key data. Thus, rather than encrypting the entire virtual file system 130 with a single file encryption key, each file is encrypted with a unique file encryption key. Thus, if a particular user account, process, or application is compromised and access is gained to the virtual file system 130 via that user account, process, or application, only the portion of the data associated with that user, process, or application is accessible. This is because only those files associated with the user account, process, or user application can be decrypted for that user account, process, or user application.

Furthermore, a privileged user cannot haphazardly view sensitive files because those files are individually encrypted. The privileged user would only be able to view sensitive files by taking deliberate and protracted steps to view the sensitive files. Thus, though it may be possible for a malicious privileged user to eventually gain access to sensitive files, it is much more difficult than in typical data protection schemes. Another benefit is that non-malicious privileged users cannot easily and accidentally view the sensitive files due to the enhanced encryption and access control performed by the access control and encryption module 115.

In one embodiment, the access control and encryption module 115 includes an encryption engine 170. The encryption engine 170 encrypts each file of the virtual file system 130 with an individual file encryption key 171. The encryption engine 170 includes a plurality of file encryption keys 171. Additionally, the encryption engine 170 can include a volume key 172 represented by volume key data. The volume key 172 is global to the entire virtual file system 130. The volume key 172 can be used to generate the file encryption keys 171. In one embodiment, the encryption engine 170 can also include application keys 173 each represented by application key data. Each application key 173 is related to a respective application container as described further below. The file encryption keys 171 are shown as being stored in the encryption engine 170, in one embodiment the file encryption keys 171 exist only temporarily between encryption and decryption of files.

In one embodiment, the access control encryption module 115 generates a plurality of application containers 140, 150, 160. Each of the application containers 140, 150, 160 is associated with a particular user, user applications, or processes. Each of the application containers 140, 150, 160 include a list of files, rules, processes, and encryption keys associated with the particular user, user processes, or user applications. A user that accesses the computing system has an application container that is associated with that user. Not only does the access control and encryption module 115 grant the user access only to those files associated with that user's application container, the application container only has access to encryption keys for the files associated with that container. In this way, the access control and encryption module 115 restricts user access to files associated with a user and enables decryption of only those files associated with the user. Thus, the access control and encryption module 115 provides both access control and enhanced encryption.

In one embodiment, the application container 140 includes associated files 141, rules 142, processes 143, and encryption keys 144. A user associated with the application container 140 only has access to the files 141 listed in the application container. Additionally, only processes, programs, applications, or other executables listed in the processes 143 associated with the application container 140 can access the files 141 listed in the application container. The rules 142 can further restrict access to the files 141.

In one embodiment, the application container 150 includes associated files 151, rules 152, processes 153, and encryption keys 154. A user associated with the application container 150 only has access to the files 151 listed in the application container. Additionally, only processes, programs, applications, or other executables listed in the processes 153 associated with the application container 150 can access the files 151 listed in the application container. The rules 152 can further restrict access to the files 151.

In one embodiment, the application container 160 includes associated files 161, rules 162, processes 163, and encryption keys 164. A user associated with the application container 160 only has access to the files 161 listed in the application container. Additionally, only processes, programs, applications, or other executables listed in the processes 163 associated with the application container 160 can access the files 161 listed in the application container. The rules 162 can further restrict access to the files 161.

In one embodiment, the associated files 141, 151, 161 are respective list of files that indicate which files respective users or user applications are authorized to access. In one embodiment, the rules 142, 152, 162 indicate which user or users can access the files associated with the respective application containers 140, 150, and 160. In one embodiment, the process 143, 153, 163 are respective list of the known processes, programs, applications, or other executables authorized to access the respective files associated with the application containers 140, 150, 160.

In one embodiment, the application containers 140, 150, and 160 can include respective sets of file encryption keys 144, 154, 164 associated with the associated files 141, 151, 161. The file encryption keys 144, 154, 164 can each be subsets of the file encryption keys 171. Alternatively, in one embodiment, the application containers 140, 150, 160 do not actually contain encryption keys and all encryption keys are managed by the encryption engine 170.

In one embodiment, there can be overlap between the associated files 141, the associated files 151, and the associated files 161. In other words, an individual file from the files 133 can be associated with more than one user, process, or application. In this case, there can also be overlap between the encryption keys 144, the encryption keys 154, and the encryption keys 164.

In one embodiment, the computing system includes user applications 116-118. Each of the user applications 116-118 are associated with one or more of the containers 140, 150, 160. Each user application 116-118 can include a process or application associated with a particular user of the computing system.

In one example, a first user accesses the computing system and uses the user application 116 with which the first user is associated. The user application 116 attempts to access one or more of the files 133. The access control and encryption module 115 controls all access to the virtual file system 130 through the gateway module 114. The access control and encryption module 115 checks whether the desired files are included in the associated files 141. If the desired files from the files 133 are listed in the associated files 141, then the access control and encryption module 115 uses the encryption keys 144, or file encryption keys 171, to decrypt the selected files and gives the user application 116 access to the selected files. If the desired files from the files 133 are not listed in the associated files 141, then the access control and encryption module 115 denies access to the user application 116. Even if the user application was able to gain access to files not listed in the associated files 141, because the application container 140 does not include or have access to file encryption keys for files other than the associated files 141, such access still would not compromise the actual data.

In one embodiment, the access control and encryption module 115 not only encrypts the individual files with unique file encryption keys 171, but also encrypts the file encryption keys 171. Thus, in one embodiment, the file encryption keys 171 are themselves encrypted. The encrypted file encryption keys 171 can only be decrypted for an authorized user. When an authorized user wishes to access a file from among the associated files 141, the access control and encryption module 115 decrypts the encrypted file encryption key 171 (or 144) in order to obtain the original unencrypted file encryption key. The file itself can then be decrypted. Thus, the access control encryption module 115 provides double encryption by encrypting both files and encryption keys.

In one embodiment, the computing environment 110 includes one or more privileged user applications 119. The privileged user application 119 can include one or more applications or processes associated with a privileged user of the computing environment 110. If the privileged user application 119 attempts to access a selected file through one of the application containers 140, 150, 160 the rules 142, 152, 162 can prohibit the privileged user application 119 from accessing the selected file.

Process

Figure 2:
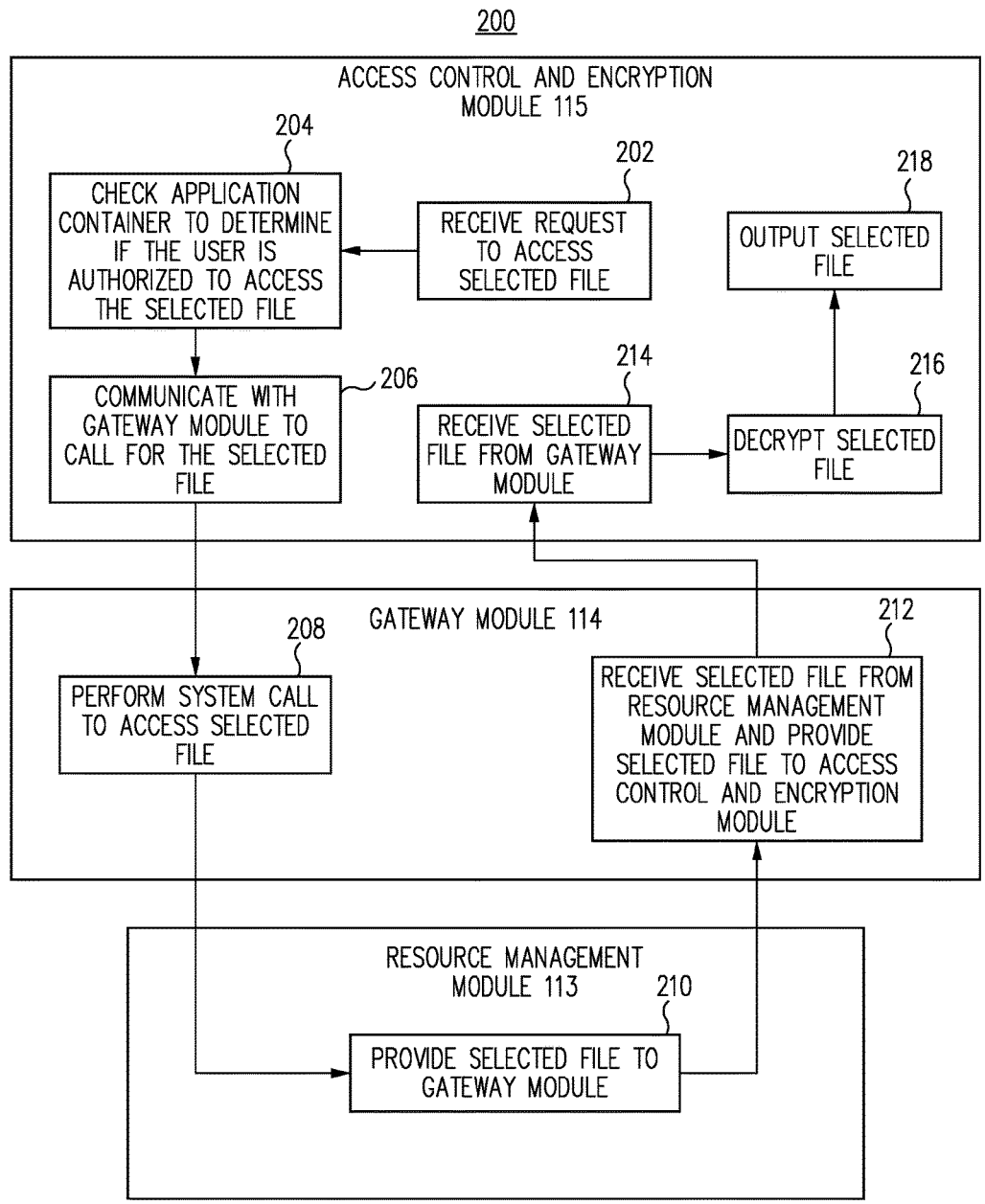
FIG. 2 is a block diagram of a process for providing access control and enhanced encryption for a file system, in accordance with one embodiment.

FIG. 2 illustrates a functional flow diagram of a process 200 for providing access control and enhanced encryption for a file system, in accordance with one embodiment.

At block 202, the access control and encryption module 115 receives a request from a user application to access the selected file, according to one embodiment. From block 202 the process proceeds to block 204.

At block 204, the access control and encryption module 115 checks the application container to determine if the user application is authorized to access the selected file, according to one embodiment. From block 204, the process proceeds to block 206.

At block 206, the access control and encryption module 115 communicates with the gateway module 114 to call for the selected file, according to one embodiment. From block 206, the process proceeds to block 208.

At block 208, the gateway module 114 performs a system call to access the selected file from the resource management module 113, according to one embodiment. From block 208, the process proceeds to block 210.

At block 210, the resource management module 113 provides the selected file to the gateway module 114, according to one embodiment. From block 210, the process proceeds to block 212.

At block 212, the gateway module 114 receives the selected file from the resource management module 113 and provides the selected file to the access control and encryption module 115, according to one embodiment. From block 212, the process proceeds to block 214.

At block 214, the access control and encryption module receives the selected file from the gateway module 114, according to one embodiment. From block 214, the process proceeds to block 216.

At block 216, the access control and encryption module 115 decrypts the selected file, according to one embodiment. From block 216, the process proceeds to block 218.

At block 218, the access control and encryption module 115 outputs the selected file, according to one embodiment.

Although a particular sequence is described herein for the execution of the process 200, other sequences can also be implemented in accordance with principles of the present disclosure.

Figure 3:
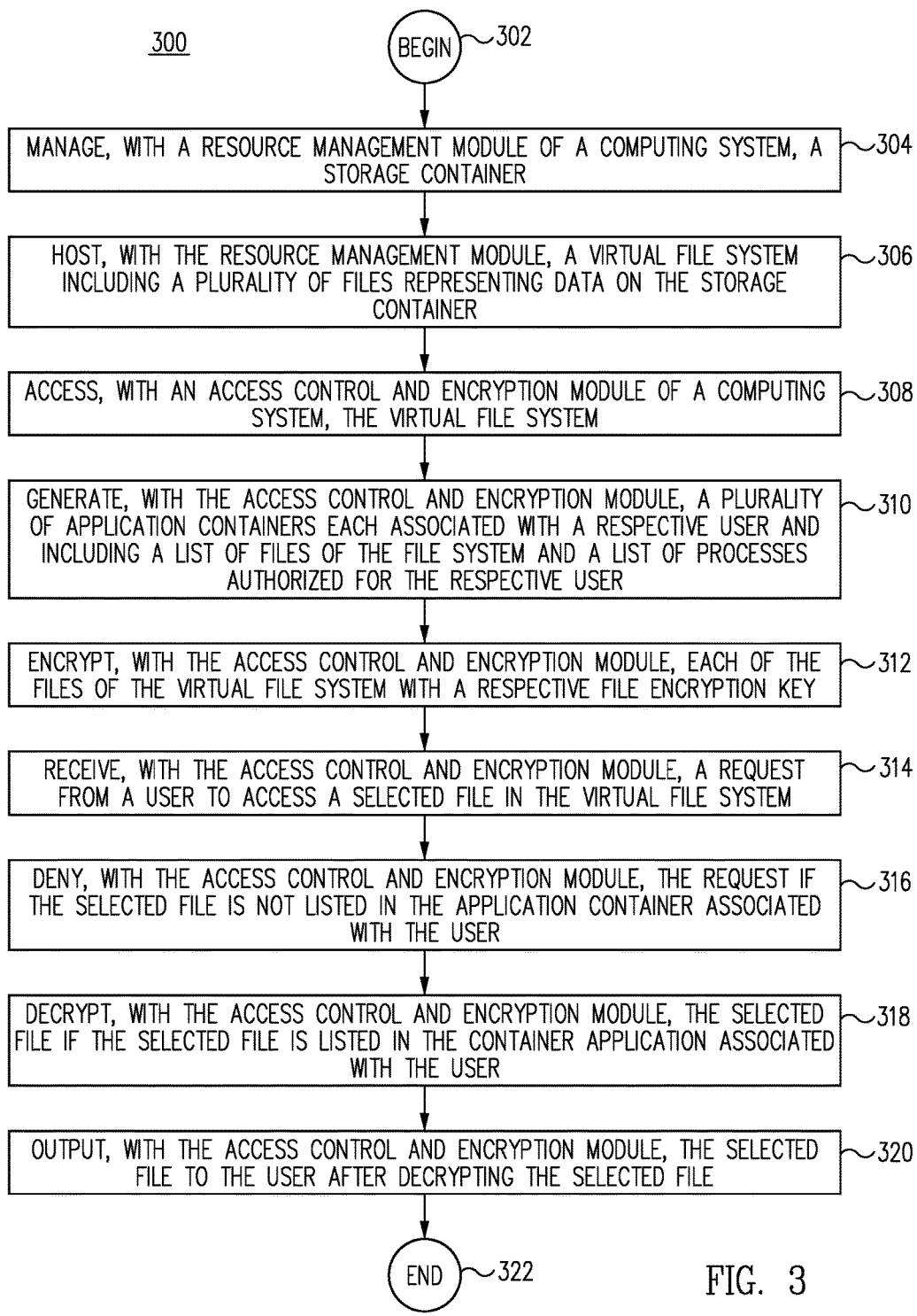
FIG. 3 is a flow diagram of a process for providing access control and enhanced encryption for a file system, in accordance with one embodiment.

FIG. 3 illustrates a flow diagram of a process 300 for providing access control and enhanced encryption for a file system, according to various embodiments.

In one embodiment, process 300 for providing access control and enhanced encryption for a file system begins at BEGIN 302 and process flow proceeds to MANAGE, WITH A RESOURCE MANAGEMENT MODULE OF A COMPUTING SYSTEM, A STORAGE CONTAINER 304.

In one embodiment, at MANAGE, WITH A RESOURCE MANAGEMENT MODULE OF A COMPUTING SYSTEM, A STORAGE CONTAINER 304 process 300 for providing access control and enhanced encryption for a file system manages, with a resource management module of a computing system, a storage container.

In one embodiment, once process 300 for providing access control and enhanced encryption for a file system manages, with a resource management module of a computing system, a storage container at MANAGE, WITH A RESOURCE MANAGEMENT MODULE OF A COMPUTING SYSTEM, A STORAGE CONTAINER 304 process flow proceeds to HOST, WITH THE RESOURCE MANAGEMENT MODULE, A VIRTUAL FILE SYSTEM INCLUDING A PLURALITY OF FILES REPRESENTING DATA ON THE STORAGE CONTAINER 306.

In one embodiment, at HOST, WITH THE RESOURCE MANAGEMENT MODULE, A VIRTUAL FILE SYSTEM INCLUDING A PLURALITY OF FILES REPRESENTING DATA ON THE STORAGE CONTAINER 306, process 300 for providing access control and enhanced encryption for a file system hosts, with the resource management module, a virtual file system including a plurality of files representing data on the storage container.

In one embodiment, once process 300 for providing access control and enhanced encryption for a file system hosts, with the resource management module, a virtual file system including a plurality of files representing data on the storage container at HOST, WITH THE RESOURCE MANAGEMENT MODULE, A VIRTUAL FILE SYSTEM INCLUDING A PLURALITY OF FILES REPRESENTING DATA ON THE STORAGE CONTAINER 306, process flow proceeds to ACCESS, WITH AN ACCESS CONTROL AND ENCRYPTION MODULE OF A COMPUTING SYSTEM, THE VIRTUAL FILE SYSTEM 308.

In one embodiment, at ACCESS, WITH AN ACCESS CONTROL AND ENCRYPTION MODULE OF A COMPUTING SYSTEM, THE VIRTUAL FILE SYSTEM 308, process 300 for providing access control and enhanced encryption for a file system accesses, with an access control and encryption module of a computing system, the virtual file system, according to one embodiment.

In one embodiment, once process 300 for providing access control and enhanced encryption for a file system accesses, with an access control and encryption module of a computing system, the virtual file system at ACCESS, WITH AN ACCESS CONTROL AND ENCRYPTION MODULE OF A COMPUTING SYSTEM, THE VIRTUAL FILE SYSTEM 308, process flow proceeds to GENERATE, WITH THE ACCESS CONTROL AND ENCRYPTION MODULE, A PLURALITY OF APPLICATION CONTAINERS EACH ASSOCIATED WITH A RESPECTIVE USER AND INCLUDING A LIST OF FILES OF THE FILE SYSTEM AND A LIST OF PROCESSES AUTHORIZED FOR THE RESPECTIVE USER 310.

In one embodiment, at GENERATE, WITH THE ACCESS CONTROL AND ENCRYPTION MODULE, A PLURALITY OF APPLICATION CONTAINERS EACH ASSOCIATED WITH A RESPECTIVE USER AND INCLUDING A LIST OF FILES OF THE FILE SYSTEM AND A LIST OF PROCESSES AUTHORIZED FOR THE RESPECTIVE USER 310 the process 300 generates, with the access control and encryption module, a plurality of application containers each associated with a respective user and including a list of files of the file system and a list of processes authorized for the respective user.

In one embodiment, once process 300 generates, with the access control and encryption module, a plurality of application containers each associated with a respective user and including a list of files of the file system and a list of processes authorized for the respective user at GENERATE, WITH THE ACCESS CONTROL AND ENCRYPTION MODULE, A PLURALITY OF APPLICATION CONTAINERS EACH ASSOCIATED WITH A RESPECTIVE USER AND INCLUDING A LIST OF FILES OF THE FILE SYSTEM AND A LIST OF PROCESSES AUTHORIZED FOR THE RESPECTIVE USER 310, process flow proceeds to ENCRYPT, WITH THE ACCESS CONTROL AND ENCRYPTION MODULE, EACH OF THE FILES OF THE VIRTUAL FILE SYSTEM WITH A RESPECTIVE FILE ENCRYPTION KEY 312.

In one embodiment, at ENCRYPT, WITH THE ACCESS CONTROL AND ENCRYPTION MODULE, EACH OF THE FILES OF THE VIRTUAL FILE SYSTEM WITH A RESPECTIVE FILE ENCRYPTION KEY 312 the process 300 for providing access control and enhanced encryption for a file system encrypts, with the access control and encryption module, each of the files of the virtual file system with a respective file encryption key.

In one embodiment, once process 300 for providing access control and enhanced encryption for a file system encrypts, with the access control and encryption module, each of the files of the virtual file system with a respective file encryption key at ENCRYPT, WITH THE ACCESS CONTROL AND ENCRYPTION MODULE, EACH OF THE FILES OF THE VIRTUAL FILE SYSTEM WITH A RESPECTIVE FILE ENCRYPTION KEY 312, process flow proceeds to RECEIVE, WITH THE ACCESS CONTROL AND ENCRYPTION MODULE, A REQUEST FROM A USER TO ACCESS A SELECTED FILE IN THE VIRTUAL FILE SYSTEM 314.

In one embodiment, at RECEIVE, WITH THE ACCESS CONTROL AND ENCRYPTION MODULE, A REQUEST FROM A USER TO ACCESS A SELECTED FILE IN THE VIRTUAL FILE SYSTEM 314 the process 300 for providing access control and enhanced encryption for a file system receives, with the access control and encryption module, a request from a user to access a selected file in the virtual file system.

In one embodiment, once the process 300 for providing access control and enhanced encryption for a file system receives, with the access control and encryption module, a request from a user to access a selected file in the virtual file system at RECEIVE, WITH THE ACCESS CONTROL AND ENCRYPTION MODULE, A REQUEST FROM A USER TO ACCESS A SELECTED FILE IN THE VIRTUAL FILE SYSTEM 314, process flow proceeds to DENY, WITH THE ACCESS CONTROL AND ENCRYPTION MODULE, THE REQUEST IF THE SELECTED FILE IS NOT LISTED IN THE APPLICATION CONTAINER ASSOCIATED WITH THE USER 316.

In one embodiment, at DENY, WITH THE ACCESS CONTROL AND ENCRYPTION MODULE, THE REQUEST IF THE SELECTED FILE IS NOT LISTED IN THE APPLICATION CONTAINER ASSOCIATED WITH THE USER 316 the process 300 for providing access control and enhanced encryption for a file system denies, with the access control and encryption module, the request if the selected file is not listed in the application container associated with the user.

In one embodiment, once the process 300 for providing access control and enhanced encryption for a file system denies, with the access control and encryption module, the request if the selected file is not listed in the application container associated with the user at DENY, WITH THE ACCESS CONTROL AND ENCRYPTION MODULE, THE REQUEST IF THE SELECTED FILE IS NOT LISTED IN THE APPLICATION CONTAINER ASSOCIATED WITH THE USER 316, process flow proceeds to DECRYPT, WITH THE ACCESS CONTROL AND ENCRYPTION MODULE, THE SELECTED FILE IF THE SELECTED FILE IS LISTED IN THE CONTAINER APPLICATION ASSOCIATED WITH THE USER 318.

In one embodiment, at DECRYPT, WITH THE ACCESS CONTROL AND ENCRYPTION MODULE, THE SELECTED FILE IF THE SELECTED FILE IS LISTED IN THE CONTAINER APPLICATION ASSOCIATED WITH THE USER 318 the process 300 for providing access control and enhanced encryption for a file system decrypts, with the access control and encryption module, the selected file if the selected file is listed in the container application associated with the user.

In one embodiment, once the process 300 for providing access control and enhanced encryption for a file system decrypts, with the access control and encryption module, the selected file if the selected file is listed in the container application associated with the user at DECRYPT, WITH THE ACCESS CONTROL AND ENCRYPTION MODULE, THE SELECTED FILE IF THE SELECTED FILE IS LISTED IN THE CONTAINER APPLICATION ASSOCIATED WITH THE USER 318, process flow proceeds to OUTPUT, WITH THE ACCESS CONTROL AND ENCRYPTION MODULE, THE SELECTED FILE TO THE USER AFTER DECRYPTING THE SELECTED FILE 320.

In one embodiment, at OUTPUT, WITH THE ACCESS CONTROL AND ENCRYPTION MODULE, THE SELECTED FILE TO THE USER AFTER DECRYPTING THE SELECTED FILE 320 the process 300 for providing access control and enhanced encryption for a file system outputs, with the access control and encryption module, the selected file to the user after decrypting the selected file.

In one embodiment, once the process 300 for providing access control and enhanced encryption for a file system outputs, with the access control and encryption module, the selected file to the user after decrypting the selected file at OUTPUT, WITH THE ACCESS CONTROL AND ENCRYPTION MODULE, THE SELECTED FILE TO THE USER AFTER DECRYPTING THE SELECTED FILE 320, process flow proceeds to END 322.

In one embodiment, at END 322 the process for providing access control and enhanced encryption for a file system is exited to await new data and/or instructions.

Figure 4:
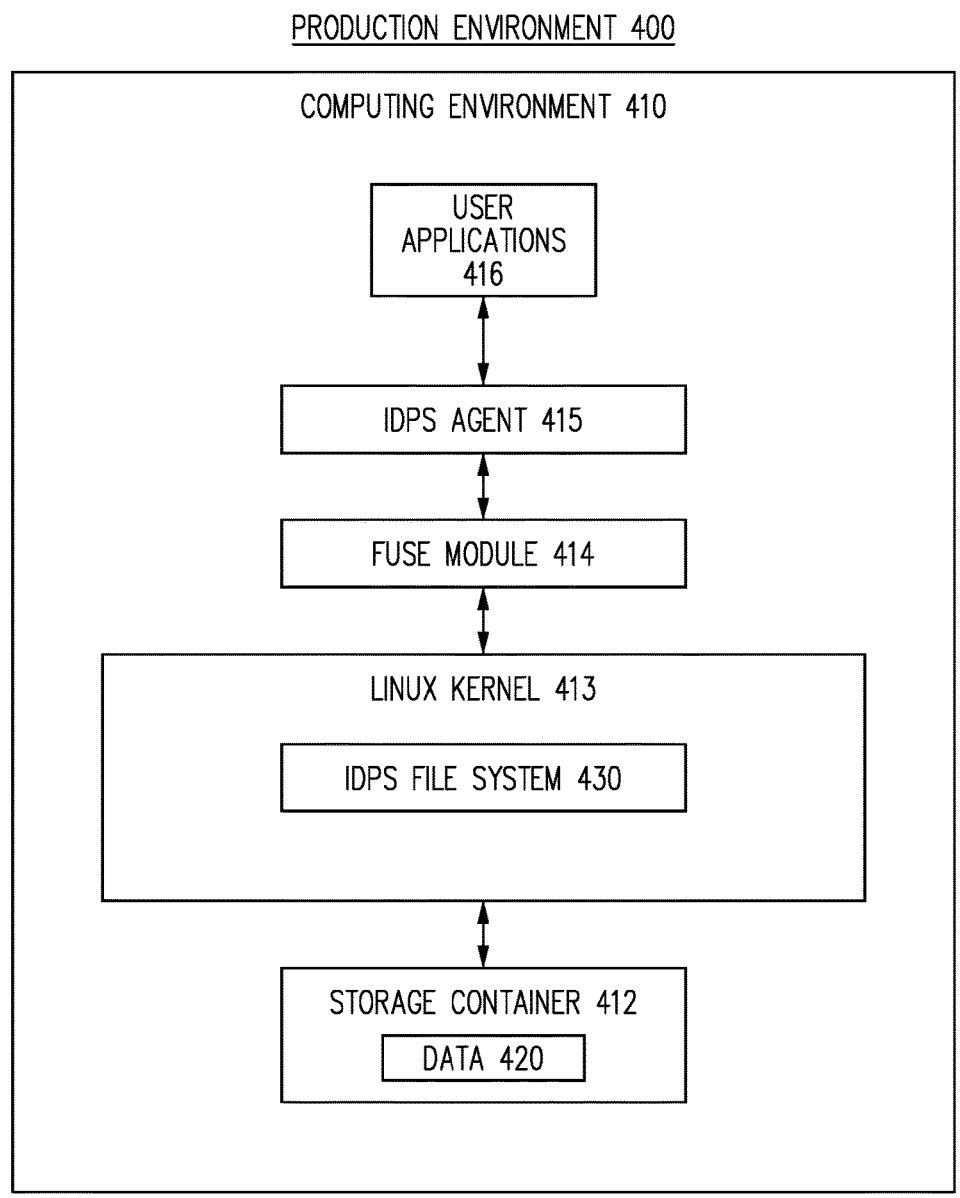
FIG. 4 is a block diagram of software architecture for providing access control and enhanced encryption for a file system, in accordance with one embodiment.

FIG. 4 illustrates a block diagram of a production environment 400 for providing access control and enhanced encryption for a file system, according to one embodiment.

The production environment 400 includes a computing environment 410. The computing environment 410 includes a storage container 412, a Linux Kernel 413, a FUSE module 414, an IDPS agent 415, and user applications 416. The various components of the computing environment 410 are coupled together by one or more physical or virtual communication channels, according to one embodiment.

In one embodiment, the Linux Kernel 413 is a resource management module. The FUSE module 414 is a gateway module. The IDPS agent 415 is an access control and encryption module. The IDPS file system 430 is a virtual file system.

In embodiment, the IDPS agent 415 is a python client that is installed on a user's machine and designed to protect the storage container 412 by connecting to a project on IDPS. Specifically, the user needs to initialize the IDPS agent 415 with an IDPS Virtual Appliance's address, and an IDPS application programming interface (API) key.

In one embodiment, once the IDPS agent 415 is initialized, a secure file system command can be issued to start the IDPS file system 430 daemon. The daemon is a FUSE MODULE 414-based application, which implements a virtual file system backed by a real file system. For instance, a user can format an xfs 20 GB disk and mount it to the storage container 412. This will be the backend for the IDPS file system 430, which will be mounted on top of storage container 412. Contents on the storage container 412 will be encrypted when accessed via the IDPS file system 430 mount.

In one embodiment, once an IDPS agent 415 is installed, a new user "idps_admin" is created. Only the idps_admin user will be able to run IDPS file system-related commands. The daemon is "guarded" by a watchdog that makes sure it is up and running at all times.

In one embodiment, basic commands for the IDPS file system 430 include idps_agent initialize <appliance-address><api-key>, idps_agent secure-fs <backend><mountpoint><policy-file>, and idps_agent unmount-fs <mountpoint>.

In one example a 20 GB disk device has been added on with/dev/sdb: mkfs –t xfs/dev/sdb, mount –t xfs/dev/sdb/ mnt/my-backend, and idps_agent secure-fs/mnt/my-backend/mnt/my-secure-fs./my-policy. Now, any access to/mnt/my-secure-fs/ will be controlled by the IDPS file system 430 and the policy, although all "real" data will actually be written to/mnt/my-backend/.

In one embodiment, the IDPS agent 415 depends on a user-defined policy, which describes the access-control entities and rules. The policy is a json-formatted file and describes the following entities: processes, applications, and files.

In one embodiment, the processes are a list of the known processes that the policy uses. Each executable defines an Xid, a path, and a description. The Xid is a string representing the ID of the process. The path is the full path to the process. The description is an optional short string describing the executable.

In one embodiment, the application containers are the main entity of the policy. Each application container contains a closed definition of a set of processes bound to a list of files. On top of that, it also defines a set of rules to be able to deny access to a root user. The application container include an App_id, a description, Xids, files, and deny rules. The App_id is a string representing the ID of the application container. The description is an optional short string describing the application container. The Xids are a list of processes that are allowed by this application container. The files are a list of files (fullpath) that this application container can access. The deny rules include root: true/false and switched-user: true/false. These rules enable the application container to deny access to root users and switched users.

The following algorithm describes the flow of how the access control is achieved. A process P is attempting to access a file F in the IDPS file system 430. For each application container in the policy, if P is defined in the Xid of A, and if F is listed in the associated files of the application container A, then if deny root user is true and the user requesting is root, or if deny switched-user is true and the user is not the user than logged in, then deny access to A, else allow access to A and complete requested file system operation. Linux may still deny access, according to users, groups, ACLs, etc. If no application container was allowed access, then deny access for P on F.

In one embodiment, a policy denies all access unless explicitly defined. This may cause systems and processes to not work while the admin is in a learning and development phase. In this case, the admin can set the IDPS file system's 430 enforce-mode to "permissive" and the policy's default will be to "allow all" and issue warnings on each would-be-denied access. The admin can then modify the policy accordingly. Once the admin is satisfied with the policy, he or she should set the enforce-mode back to "enforce" to enable access control again.

In one embodiment, the enforce-mode is a file system attribute that can be changed by issuing a command to the IDPS agent 415.

The following is a simple example of a policy file serving only as an example of how to define and create the various aspects of the policy. The policy can be given a name, such as "My policy version 0.1. The policy can be given a description such as "A policy for splunk and mysql". The processes can include Xid: mysql, path: /usr/bin/mysql*, description: mysql and friends, Xid: splunk, path: /usr/bin/splunkd, and description: Splunk daemon. The asterisk indicates all processes that start with mysql. The application containers can include app_id: splunk, description: splunk and friends, files: /splunk/ and/logs/splunk.log, Xids: splunk, deny if root=true or switched_user=true. The application containers can further include app_id: MySQL, description: all mysql related, files: /mysql/data/ and /logs/mysql/*.log, Xids: mysql, deny if root=true or switched_user=true.

In one embodiment, the IDPS file system 430 utilizes the advanced key management mechanisms supported by the IDPS agent 415. The following keys can be used: volume keys, file encryption keys, application keys, and extended attribute authorization keys. In one embodiment, fewer or more encryption keys and processes can be used.

In one embodiment the volume key is generated once a new IDPS file system 430 is secured on a new volume. It is then stored on the IVKM, indexed by the project name and the volume id. The volume key is global to the whole IDPS file system 430, and is used for encryption of file names and encryption of the private authorization file.

In one embodiment, file name encryption is done using Deterministic Encryption, as each file's name needs to map consistently to a name on the backend file system. For this, the cipher of choice is AES-SIV-CTR, where the IV is calculated synthetically (SIV=synthetic IV) from the input, in this case—the file name. Once the IV is calculated, the data is encrypted using CTR cipher, with the volume key. On the disk, the file name's format is: $<SIV><E_{VK}(\text{filename})>$. For decryption purposes, the SIV on the disk is used, but it is also verified versus re-calculation of the SIV from the decrypted filename. This provides another level of authentication.

In one embodiment, The IDPS file system 430 saves some data on the backend disk in order to be able to launch in different scenarios, mainly a scenario where the disk is removed and added to a different machine. The encryption uses the volume key as the encryption key, and GCM as the cipher. The GCM-IV is generated randomly. The GCM-AAD is the volume key's version (volume key can be rotated). The GCM-TAG is calculated and saved to the disk for verification on read. The format on the disk will be: $<GCM-IV><GCM-AAD><E_{VK}(\text{plain-data})><GCM-TAG>$.

For each file a randomly generated file encryption key is created on file creation. The file encryption key is used as an encryption key for the file's data. The file encryption key is not stored directly anywhere, and is wiped from memory once it's not used any more. The cipher used to encrypt file data is AES-XTS, where the initial tweak is generated randomly on file creation and saved in the file's private extended attribute and data is encrypted in pages of size 4096 bytes (4K), where each page uses a different tweak, calculated using the initial tweak and the page's offset.

Because AES-XTS is a block cipher and can't encrypt lengths that are smaller than 16 bytes, for these cases the data is padded with zeros up to length 16, encrypted and saved in a separate private extended attribute—always 16 bytes long. For file sizes to be consistent, the requested number of bytes is also written to disk.

In one embodiment, for each application defined in the policy, an asymmetric encryption key is generated, such as RSA 2048. Both the public and the private keys are then stored on the IVKM, indexed by the project name, volume id, and the application id. Application keys are also authenticated using IDPS authorization tokens mechanism, which allows coupling protected items with specific authorization tokens. Once this mechanism is used, access to the application keys is allowed only when an authorization token is supplied by the caller. In order to manage these authorization tokens, a separate private authorization file is created on the backend file system. The application keys are used for encrypting a file's file encryption key by the public key and for decrypting for a file's file encryption key by the private key. When a file is created and the file encryption key is generated, a private extended attribute is created and saved. In this extended attribute the file encryption key is encrypted by any application in the policy that has access to this file. When an application reads or writes a file, the $E_{AK}(FK)$ is read from the private extended attribute. Then the file encryption key is decrypted for: $D_{AK}(E_{AK}(FK))=FK$. For "permissive" mode, a default permissive application is created, along with its own application key, so that files can be created although they were not defined by any application in the policy. Due to the nature of public-private key pairs, the public key can be cached within the system indefinitely. This allows for safe file creation and sharing between applications. Only applications that are "alive" need the private key in order to decrypt for the file encryption key and be able to read/write data, so private keys are retrieved from the IDPS key management only on demand. The private keys are cached for a limited time (e.g. 60 secs), and then discarded.

In one embodiment, extended attributes for files are authenticated using the extended application attribute key. The extended application attribute key is generated on IDPS file system 430 initialization and stored on the IVKM. It's indexed by the project name and volume id. The key is used for Authentication HMAC for extended attributes. Once an extended attribute is saved to disk, a HMAC-SHA256 digest is calculated and saved along with it for later authentication purposes. The format of the extended attribute on disk is: $<\text{xattr-plain}><\text{HMAC-SHA256}_{XK}(\text{xattr-plain})>$. In one embodiment, for each file created by the IDPS file system 430 a private extended attribute is also created. This attribute contains important information regarding the file. In particular, the private extended attribute includes a 32 byte hash digest of the policy—SHA256(policy file data), IDPS file system 430 version—an 8 byte global version of IDPS file system 430, a 16 byte initial tweak for AES-XTS, a 2 byte file encryption key version, an 8 byte file inode number, a 2 byte number of applications defining this file, and a list of the applications. The private extended attribute includes for each application a 20 byte hash digest of the application id—SHA1(app id), a 64 byte $E_{AK}(FK)$ which is the file encryption key encrypted with the application key, and a two byte application key version. The private extended attribute is hidden from applications, and can't be accessed, listed or removed. Each access to the extended attribute is authenticated versus the actual inode number of the file as issued by the backend file system.

In one embodiment, a global authorization file is created on IDPS file system 430 initialization and saved on the backend file system. The path for this file is <backend_path>/.idpsfs/authz. The file is owned by idps_admin user, and is not accessible via the IDPS file system 430 mount-point. The authorization file contains a list of application id's and their corresponding authz tokens for accessing application keys from the IVKM. The format of the authz file includes a 16 byte header and a list of applications from the policy. The authz file includes for each application a 64 byte hex authorization token, a 20 byte hash digest of the application id—SHA1(app id), a 2 byte application key version, and 2 byte flags. The flags include a 1 bit Is_admin, a 1 bit Is_valid, and a 14 bit Future use.

In one embodiment, each IDPS file system 430 must be initialized for the first time. For this the following must be prepared: a working IDPS Virtual Appliance, an API Key obtained from IVKM, a disk device, either real or loop-device—formatted and mounted, and a valid policy.

In one embodiment, the main role of the idps_admin is to update the policy according to the warnings issued on would-be-denied access attempts. For this a special command can be issued: idps_agent set-fs-policy <mountpoint>. The inner workings behind this command are the following: the new policy is evaluated, accepted and updated (assuming it's valid); files are not updated actively, but from now on private extended attributes that were created with the old policy will be changed according to the new policy; and the private authz file will change according to the new policy. The changing of private attributes can be achieved by comparing the policy hash within each and every private extended attribute. Changing the private authz entails that new applications will be added and old applications will not be deleted, as applications may return in later policies, and their keys need to still be accessed with the same authz tokens.

In one embodiment, the secure-fs command will start the IDPS file system 430 in "enforce" mode by default. When a policy is still in development, the idps_admin can set the enforce mode to "permissive" while still learning the ins and outs of files and processes that need to be defined by the policy, and the desired rules to apply. idps_agent set-fs-enforce-mode permissive: In this phase, the policy will be bypassed in effect, and all would-be-denied accesses will be logged to syslog (/var/log/messages on Redhat Linux). Once the idps_admin is satisfied, the IDPS file system 430 needs to be set back to enforced mode: idps_agent set-fs-enforce-mode enforce. Now, access-control will behave according to the policy, without any bypasses.

In one embodiment, at any point in time, any application key (AK) can be rotated. The rotation calls for $E_{AK}(FK)$ for each file defined in the policy regarding the relevant application to be recalculated and changed on disk in the file's extended attribute. The actual implementation achieves this in a "lazy" fashion—only files that are actually accessed will have their attribute changed. Note that the encryption of the data itself does not change at all. Only the attribute that allows for retrieving the actual file encryption key. idps_agent rotate-fs-app-key <mountpoint><app_id>.

In one embodiment, each command performed on the IDPS agent 415 is logged and audited in the IDPS Virtual Appliance. Logging of errors is done via syslog.

In one embodiment, encrypting each file with a different key achieves cryptographic separation. However, in this case, even the key-encrypting-keys are separated according to the policy, i.e. application keys. This means that the damage of compromising an application key is only files that can be accessed by this application container. In effect this is a double-layer cryptographic separation.

In one embodiment, the IDPS file system 430 achieves (in a simple and easy to use manner) an enhancement to Linux's permissions and access control. This is done by defining the "application" entity. Allowing access to predefined files only by predefined processes enables (by elimination) the denial of access unless defined explicitly.

In one embodiment, one of the main security issues in administrating a Linux environment is trusting a single root user with privileges that allow access to all the files throughout the system. Even if the files on the disk are encrypted full-disk-encryption (dm-crypt), once the disk is unlocked the root-user can access the plain data. For more complex encrypted file system-based solutions (ecryptfs) this is still the case where once the file system is mounted the root-user has access to all the files. The IDPS file system 430 allows denial of these cases. First by the ability to identify when a root-user is trying to access a file. Secondly, by defining that the root-user is not the user administrating IDPS file system 430, but a different user (idps_admin), so that root can't easily "trick" IDPS file system 430 to allow access.

In one embodiment, the IDPS file system 430 uses IDPS Key Management to store and access keys. This allows for a "fire and forget" approach when dealing with keys storage and retrieval. It also ensures the security of these keys and minimizes their risk of being compromised.

Figure 5:
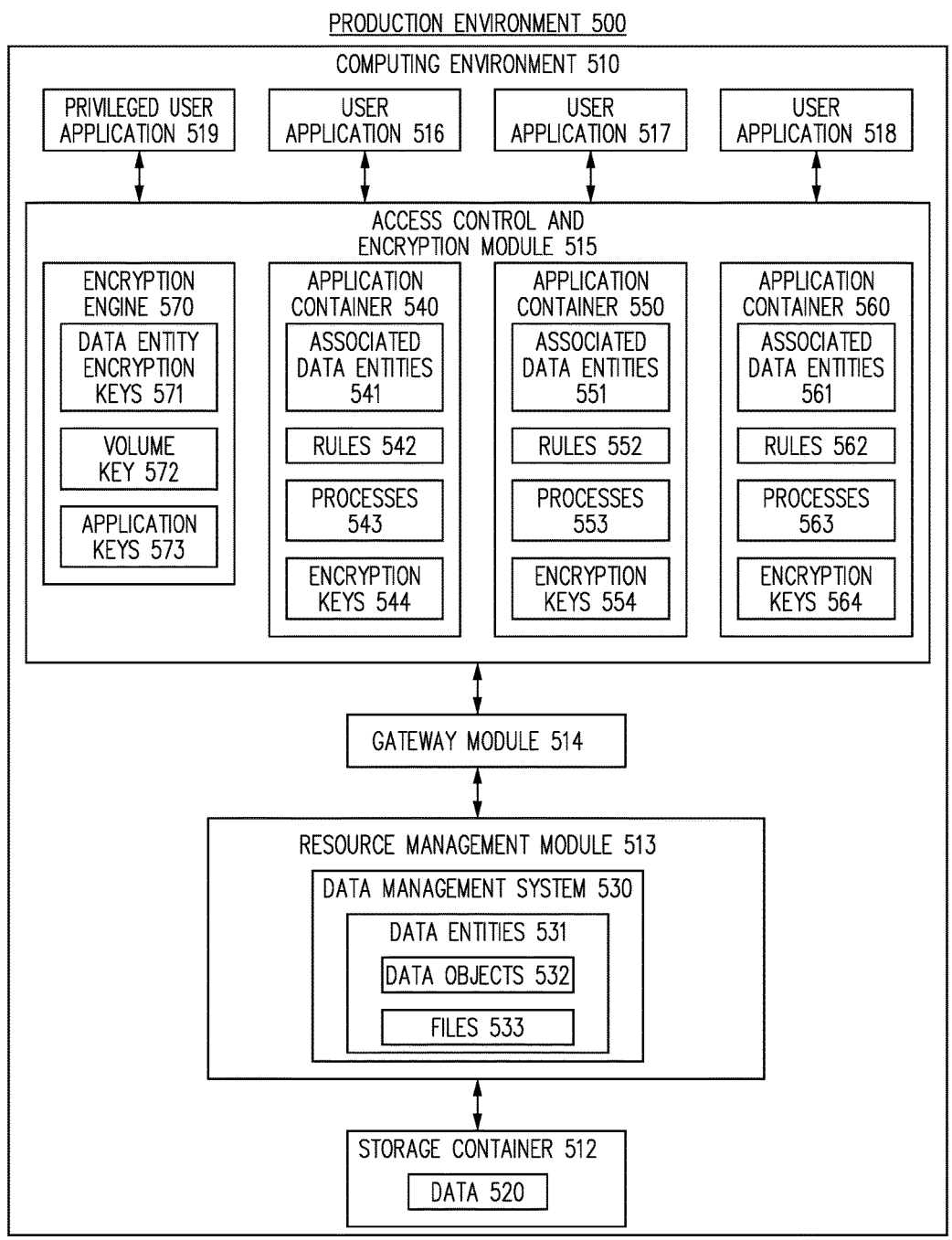
FIG. 5 is a block diagram of software architecture for providing access control and enhanced encryption for a data management system, in accordance with one embodiment.

FIG. 5 illustrates a block diagram of a production environment 400 for providing access control and enhanced encryption for a data management system, according to one embodiment.

The production environment 500 includes a computing environment 510. The computing environment 510 includes a storage container 512, a resource management module 513, a gateway module 514, an access control and encryption module 515, user applications 516 to 518, and a privileged user application 519. The various components of the computing environment 510 are coupled together by one or more physical or virtual communication channels, according to one embodiment.

The computing environment 510 represents one or more computing systems such as a server, a computing cabinet, and/or distribution center that is configured to receive, execute, and host one or more data storage and access systems, according to one embodiment. The computing environment 510 represents a traditional data center computing environment, a virtual asset computing environment (e.g., a cloud computing environment), or a hybrid between a traditional data center computing environment and a virtual asset computing environment, according to one embodiment.

In one embodiment, the storage container 512 stores data 520. The storage container 512 can include one or more servers, hard disk drives, solid-state drives, or other physical or virtual storage devices/data sources.

In one embodiment, the resource management module 513 manages direct access to the data 520 in the storage container 512. The data 520 stored on the storage container 512 can include data related to the operation of one or more computing systems or peripheral devices that can be operatively connected to the one or more computing systems. If such data is damaged, deleted, or altered there can be serious ramifications to the functionality of the one or more computing devices or peripheral computing devices. In some cases the computing systems or devices can become defective or entirely nonfunctional.

Furthermore, the data 520 can include sensitive personal data, confidential business data, or other kinds of sensitive data whose access should be restricted and whose loss would be highly detrimental to individuals or organizations. Thus, any access to the storage container 512, whether to read data, erase data, or write data must be carefully managed. The resource management module 513 manages direct access to the storage container 512.

In one embodiment, in order to protect the integrity of the data 520 in the storage container 512, the resource management module 513 hosts a data management system 530. The data management system 530 can be hosted in a physical or virtual memory device mounted to the storage container 512 through the resource management module 513. The data management system 530 includes data entities 531 such as data objects 532 and/or files 533 that represent the data 520 stored in the storage container 512. The data entities 531 can include resources, groups of objects, groups of files, other subsets of the data 520, or other data structures.

As will be explained in more detail below, when a user application or process seeks to access the data 520 in the storage container 512, in actuality the user application or process interacts with the data management system 530 that includes all or part of the data 520 organized in the data entities 531 such as data objects 532, files 533, or other types of data structures. In this way, the resource management module 513 prevents direct access to the storage container 512 by hosting the data management system 530.

In one embodiment, the resource management module 513 is the kernel of an operating system associated with one or more computing systems of the computing environment 510. In one embodiment, the computing environment 510 utilizes a Linux operating system. In this case, the resource management module 513 is the Linux kernel. In one embodiment, the computing environment 510 can utilize a Microsoft Windows operating system, in which case the resource management module 513 can include Microsoft Windows kernel. In one embodiment, the computing environment 510 utilizes a Macintosh OS X operating system and the resource management module 513 is an OS X kernel such as XNU. The resource management module 513 can include monolithic kernels, micro kernels, hybrid kernels, nanokernels, exokernels or other types of kernels suitable for managing the storage container 512. In one embodiment, the memory management module 513 is a hypervisor, a virtual machine monitor, or a collection of device drivers.

In one embodiment, the resource management module 513 includes a plurality of system calls. The system calls cause the resource management module 513 to perform requested actions on the data management system 530 and/or the storage container 512. The system calls can include close, open, read, wait, and write. The system calls can allow access to the data management system 530.

In one embodiment, the data management system 530 is a virtual file system and the data entities include files. In one embodiment, the data management system is a data object management system and the data entities are data objects. Alternatively, the data management system 530 can be another type of data management system that manages organization and access to data entities 531.

In one embodiment, the gateway module 514 enables access to the resource management module 513 and the data management system 530 by user applications of the computing system. User applications can communicate with the data management system 530 via the gateway module 514. The gateway module 514 protects the resource management module 513 from being directly manipulated by user applications. Because the resource management module 513 performs system critical operations it is desirable to limit direct access to the resource management module 513 by user applications or processes. Thus, the gateway module 514 is an intermediary between the resource management module 513 and user applications that wish to access the data management system 530.

In one embodiment, the gateway module 514 is a file system in userspace (FUSE) module. The FUSE module enables non-privileged users to create file systems without editing kernel code. This can be accomplished by running file system code in user space while the FUSE module provides only a bridge to the actual kernel interface.

In typical systems, in order to prevent the reading of sensitive data from the data management system 530 or the storage container 512, data encryption techniques are employed. In the prior art, this included encrypting the entire storage container 512 with a single encryption key. Such encryption is termed full disk encryption. One problem with full disk encryption is that there are no access controls on this type of encryption. Once the data is unlocked (decrypted) any user can access all of the data on the disk. Thus, a single security breach can yield all of the data on the entire disk accessible by the fraudster or other malfeasant. There is further risk in that a privileged user, such as an administrator, root user, or other user can easily and even accidentally view sensitive data. Organizations typically employ such an administrator or root user in order to properly maintain the computing system. Nevertheless, the organization may not wish the privileged user to view sensitive data. In typical systems, the problems of full disk encryption, and easy access to sensitive data by the privileged user, are totally unanswered.

A computing system in accordance with principles of the present disclosure addresses these drawbacks by providing the access control and encryption module 515, according to one embodiment. The access control and encryption module 515 enhances the security of the computing system by providing and intertwining the twin functions of access control and enhanced encryption. The access control and encryption module 515 restricts access to the data entities 531 such as data objects 532 and files 533 of the data management system 530 to particular users, processes, or applications of the computing system. In particular, the access control encryption module 515 segments the data management system 530 in such a way that each individual data entity 531 such as data objects 532 and files 533 is associated with one or more users and/or processes. If a particular data entity 531 is not associated with a particular user, user application, or process, then that user, user application, or process cannot access that particular data entity.

Additionally, the access control and encryption module 515 employs enhanced encryption of the data entities 531. In particular, the access control and encryption module 515 encrypts each data entity 531 individually with a unique data entity encryption key represented by unique data entity encryption key data. Thus, rather than encrypting the entire data management system 530 with a single data entity encryption key, each data entity is encrypted with a unique data entity encryption key. Thus, if a particular user account, process, or application is compromised and access is gained to the data management system 530 via that user account, process, or application, only the portion of the data associated with that user, process, or application is accessible. This is because only those data entities associated with the user account, process, or user application can be decrypted for that user account, process, or user application.

Furthermore, a privileged user cannot haphazardly view sensitive data entities such as sensitive data object, data files, or other data structures because those data entities are individually encrypted. The privileged user would only be able to view sensitive data entities by taking deliberate and protracted steps to view the sensitive data entities. Thus, though it may be possible for a malicious privileged user to eventually gain access to sensitive data entities, it is much more difficult than in typical data protection schemes. Another benefit is that non-malicious privileged users cannot easily and accidentally view the sensitive data entities due to the enhanced encryption and access control performed by the access control and encryption module 515.

In one embodiment, the access control and encryption module 515 includes an encryption engine 570. The encryption engine 570 encrypts each data entity of the data management system 530 with an individual data entity encryption key 571. The encryption engine 570 includes a plurality of data entity encryption keys 571. Additionally, the encryption engine 570 can include a volume key 572 represented by volume key data. The volume key 572 is global to the entire data management system 530. The volume key 572 can be used to generate the data entity encryption keys 571. In one embodiment, the encryption engine 570 can also include application keys 573 each represented by application key data. Each application key 573 is related to a respective application container as described further below. The data entity encryption keys 571 are shown as being stored in the encryption engine 570, in one embodiment the data entity encryption keys 571 exist only temporarily between encryption and decryption of data entities.

In one embodiment, the access control encryption module 515 generates a plurality of application containers 540, 510, 560. Each of the application containers 540, 510, 560 is associated with a particular user, user applications, or processes. Each of the application containers 540, 510, 560 include a list of data entities, rules, processes, and encryption keys associated with the particular user, user processes, or user applications. A user that accesses the computing system has an application container that is associated with that user. Not only does the access control and encryption module 515 grant the user access only to those data entities associated with that user's application container, the application container only has access to encryption keys for the data entities associated with that container. In this way, the access control and encryption module 515 restricts user access to data entities associated with a user and enables decryption of only those data entities associated with the user. Thus, the access control and encryption module 515 provides both access control and enhanced encryption.

In one embodiment, the application container 540 includes associated data entities 541, rules 542, processes 543, and encryption keys 544. A user associated with the application container 540 only has access to the data entities 541 listed in the application container. Additionally, only processes, programs, applications, or other executables listed in the processes 543 associated with the application container 540 can access the data entities 541 listed in the application container. The rules 542 can further restrict access to the data entities 541.

In one embodiment, the application container 550 includes associated data entities 551, rules 552, processes 553, and encryption keys 554. A user associated with the application container 550 only has access to the data entities 551 listed in the application container. Additionally, only processes, programs, applications, or other executables listed in the processes 513 associated with the application container 550 can access the data entities 515 listed in the application container. The rules 552 can further restrict access to the data entities 551.

In one embodiment, the application container 560 includes associated data entities 561, rules 562, processes 563, and encryption keys 564. A user associated with the application container 560 only has access to the data entities 565 listed in the application container. Additionally, only processes, programs, applications, or other executables listed in the processes 563 associated with the application container 560 can access the data entities 561 listed in the application container. The rules 562 can further restrict access to the data entities 565.

In one embodiment, the associated data entities 541, 551, 561 are respective list of data entities that indicate which data entities respective users or user applications are authorized to access. In one embodiment, the rules 542, 552, 562 indicate which user or users can access the data entities associated with the respective application containers 540, 550, and 560. In one embodiment, the process 543, 553, 563 are respective list of the known processes, programs, applications, or other executables authorized to access the respective data entities associated with the application containers 540, 550, 560.

In one embodiment, the application containers 540, 550, and 560 can include respective sets of data entity encryption keys 544, 554, 564 associated with the associated data entities 541, 551, 561. The data entity encryption keys 544, 554, 564 can each be subsets of the data entity encryption keys 571. Alternatively, in one embodiment, the application containers 540, 550, 560 do not actually contain encryption keys and all encryption keys are managed by the encryption engine 570.

In one embodiment, there can be overlap between the associated data entities 541, the associated data entities 551, and the associated data entities 561. In other words, an individual data entity from the data entities 531 can be associated with more than one user, process, or application. In this case, there can also be overlap between the encryption keys 544, the encryption keys 5154, and the encryption keys 564.

In one embodiment, the computing system includes user applications 516-518. Each of the user applications 516-518 are associated with one or more of the containers 540, 550, 560. Each user application 516-518 can include a process or application associated with a particular user of the computing system.

In one example, a first user accesses the computing system and uses the user application 516 with which the first user is associated. The user application 516 attempts to access one or more of the data entities 531. The access control and encryption module 515 controls all access to the data management system 530 through the gateway module 514. The access control and encryption module 515 checks whether the desired data entities are included in the associated data entities 541. If the desired data entities from the data entities 531 are listed in the associated data entities 541, then the access control and encryption module 515 uses the encryption keys 544, or data entity encryption keys 571, to decrypt the selected data entities and gives the user application 516 access to the selected data entities. If the desired data entities from the data entities 531 are not listed in the associated data entities 541, then the access control and encryption module 515 denies access to the user application 516. Even if the user application was able to gain access to data entities not listed in the associated data entities 541, because the application container 540 does not include or have access to data entity encryption keys for data entities other than the associated data entities 541, such access still would not compromise the actual data.

In one embodiment, the access control and encryption module 515 not only encrypts the individual data entities with unique data entity encryption keys 571, but also encrypts the data entity encryption keys 571. Thus, in one embodiment, the data entity encryption keys 571 are themselves encrypted. The encrypted data entity encryption keys 571 can only be decrypted for an authorized user. When an authorized user wishes to access a data entity from among the associated data entities 541, the access control and encryption module 515 decrypts the encrypted data entity encryption key 571 (or 544) in order to obtain the original unencrypted data entity encryption key. The data entity itself can then be decrypted. Thus, the access control encryption module 515 provides double encryption by encrypting both data entities and encryption keys.

According to an embodiment, the data access and encryption module decrypts the data entities on demand as a stream. Thus, the data access and encryption module 515 does not encrypt an entire data entity before outputting the data entity to a user. Instead, the data access and encryption module decrypts the data entity sequentially in segments outputs segments to the user as they are decrypted. According to an embodiment the segments can correspond to block or sectors of a storage container or other physical or virtual memory.

According to an embodiment, a data entity is a database. In this case, there can be an individual data entity encryption key 571 for an entire database. Alternatively, there can be separate data entity encryption keys 571 for individual rows, tables, or other segments of a database.

According to an embodiment, the encryption module 515 encrypts an entire data entity before it is output to a user.

According to an embodiment, the data entities 531 include one or more of tables or rows of a database. According to an embodiment, the database is an SQL based database. According to an embodiment, the database is a non SQL based database.

In one embodiment, the computing environment 510 includes one or more privileged user applications 519. The privileged user application 519 can include one or more applications or processes associated with a privileged user of the computing environment 510. If the privileged user application 519 attempts to access a selected data entity through one of the application containers 540, 550, 560 the rules 542, 552, 562 can prohibit the privileged user application 519 from accessing the selected data entity.

As noted above, the specific illustrative examples discussed above are but illustrative examples of implementations of embodiments of the method or process for providing access control and enhanced encryption for a file system. Those of skill in the art will readily recognize that other implementations and embodiments are possible. Therefore the discussion above should not be construed as a limitation on the claims provided below.

Using the disclosed embodiments of a method and system for providing access control and enhanced encryption for a file system, a method and system for providing access control and enhanced encryption for a file system more accurately is provided. Therefore, the disclosed embodiments provide a technical solution to the long standing technical problems of securing sensitive data against unauthorized users and privileged users by providing an access control and encryption module that provides both access control and enhanced encryption for file systems. The result is a much more accurate, adaptable, and robust, method and system for providing access control and enhanced encryption for a file system, that thereby serves to bolster confidence in storage container security methods and systems. This, in turn, results in less human and processor resources being dedicated to defending and security threats because more accurate and efficient security measures can be implemented, i.e., fewer processing and memory storage assets; less memory and storage bandwidth being dedicated to buffering and storing data security systems; and less communication bandwidth being utilized to transmit data security software and information for analysis.

In one embodiment, a computing system implemented method for providing access control and file encryption for a file system, the method includes managing, with a resource management module of a computing system, a storage container, hosting, with the resource management module, a virtual file system including a plurality of files representing data on the storage container, accessing, with an access control and encryption module of a computing system, the virtual file system and generating, with the access control and encryption module, a plurality of application containers each associated with a respective user and including a list of files of the file system and a list of processes authorized for the respective user. The method also includes encrypting, with the access control and encryption module, each of the files of the virtual file system with a respective file encryption key, receiving, with the access control and encryption module, a request from a user to access a selected file in the virtual file system, denying, with the access control and encryption module, the request if the selected file is not listed in the application container associated with the user, and decrypting, with the access control and encryption module, the selected file if the selected file is listed in the container application associated with the user. The method further includes outputting, with the access control and encryption module, the selected file to the user after decrypting the selected file.

In one embodiment, a non-transitory computer-readable medium has a plurality of computer-executable instructions which, when executed by a processor, perform a method for providing access control and enhanced encryption for a file system. The instructions include a resource management module configured to manage access to a storage container and to generate a virtual file system representing data stored in the storage container and including a plurality of files. The instructions also include a gateway module configured to mediate communication with the resource management module. The instructions further include an access control and encryption module configured to communicate with resource management module through the gateway module, to encrypt each file with a respective file encryption key, and to deny or allow access to the file system by users, the access control and encryption module including a plurality of application containers, each application containers each being associated with a respective user and including a list of files of the virtual file system that the respective user is allowed to access. an access control and encryption module of a computing system, the virtual file system.

In one embodiment, a system for providing access control and file encryption for a file system includes at least one processor and at least one memory coupled to the at least one processor, the at least one memory having stored therein instructions which, when executed by any set of the one or more processors. The process includes managing, with a resource management module of a computing system, a storage container, hosting, with the resource management module, a virtual file system including a plurality of files representing data on the storage container, accessing, with an access control and encryption module of a computing system, the virtual file system and generating, with the access control and encryption module, a plurality of application containers each associated with a respective user and including a list of files of the file system and a list of processes authorized for the respective user. The process also includes encrypting, with the access control and encryption module, each of the files of the virtual file system with a respective file encryption key, receiving, with the access control and encryption module, a request from a user to access a selected file in the virtual file system, denying, with the access control and encryption module, the request if the selected file is not listed in the application container associated with the user, and decrypting, with the access control and encryption module, the selected file if the selected file is listed in the container application associated with the user. The process further includes outputting, with the access control and encryption module, the selected file to the user after decrypting the selected file.

One embodiment is a computing system implemented method for providing access control and file encryption for a file system. The method includes providing a storage container, the storage container including data, providing a virtual file system, the virtual file system including a plurality of files, the files representing subsets of the data in the storage container, defining two or more application containers, each of the application containers including a list of processes mapped to a set of one or more files of the plurality of files in the virtual file system, for each application container, defining privileged user access rules, the privileged user access rules controlling access to the one or more files in that application container by privileged users, generating privileged user access rules data representing the defined privileged user access rules, and for each application container, assigning an application key specific to that application container. The method further includes, for each file associated with an application container, assigning a file encryption key specific to that file, for each file encryption key, generating file specific encryption key data representing respective file encryption keys, encrypting the file encryption key data for each file, for each application container, encrypting the data in each of the files of the virtual file system associated with that application container with the specific file encryption key data representing the file encryption key specific to that file. The method also includes receiving a request for access to data in a virtual file by a user, determining the process associated with the request for access to data in a virtual file by the user application, determining if the process is mapped to the virtual file in the application container containing the requested data, if the process is mapped to the virtual file in the application container containing the requested data, accessing the privileged user access rules data to determine if the user can be denied access to the requested virtual file in the application container containing the requested data, if the process is mapped to the virtual file in the application container containing the requested data, and the user cannot be denied access to the requested virtual file in the application container containing the requested data, decrypting the specific file encryption key data for the virtual file containing the requested data, and using the decrypted specific file encryption key data for the application container containing the requested data to provide the user access to the requested data.

One embodiment is a computing system implemented method for providing access control and data entity encryption for a data management system. The method includes managing, with a resource management module of a computing system, a storage container, hosting, with the resource management module, a data management system including a plurality of data entities representing data on the storage container, accessing, with an access control and encryption module of a computing system, the data management system, and generating, with the access control and encryption module, a plurality of application containers each associated with a respective user and including a list of data entities of the data entity system and a list of processes authorized for the respective user. The method further includes encrypting, with the access control and encryption module, each of the data entities of the data management system with a respective data entity encryption key, receiving, with the access control and encryption module, a request from a user to access a selected data entity in the data management system, and denying, with the access control and encryption module, the request if the selected data entity is not listed in the application container associated with the user. The method also includes decrypting, with the access control and encryption module, the selected data entity if the selected data entity is listed in the container application associated with the user and outputting, with the access control and encryption module, the selected data entity to the user after decrypting the selected data entity.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method comprising: managing, with a resource management module of a computing system, a storage container including data, the storage container being configured to ensure that a managed file system of the storage container is able to launch on a second computing entity after having been removed from a first computing entity, the resource management module being a component of a kernel of an operating system of the computing system;

hosting, with the resource management module, a virtual file system including a plurality of files representing the data;

generating, with an access control and encryption module, a plurality of application containers, including individual application containers for each respective user each application container including a user-specific list of files of the virtual file system a particular user associated with a particular application container is authorized to access and a list of processes authorized for the particular user, the user-specific list of files of the virtual file system further mapping one or more specific files to authorized processes authorized to access files of the one or more specific files, wherein each application container only has access to encryption keys for files stored therein and each user only has access to files of the application container, and only processes, programs, applications and other executables listed in a process list of the application container are allowed to access files of the application container;

creating an access control scenario wherein access to the plurality of application containers is governed by an agent whereas all real data is written directly to the virtual file system, the agent depending on a user-defined policy including access-control entities and rules denying access to root users, and wherein if a file, process, user application is not associated with a given user, the given user is denied access to the file, process or user application;

encrypting, with the access control and encryption module, each file of the virtual file system with unique randomly-generated file encryption keys specific to individual files, wherein there is a one-to-one correspondence between the unique randomly-generated file encryption keys and files in the virtual file system;

encrypting the unique randomly-generated file encryption keys;

receiving, with the access control and encryption module, a request from an application program process of a user to access data within a particular file in the virtual file system;

determining whether the application program process of the request is mapped in the list of processes to the particular file, and further determining whether the user is also authorized access to the data of the particular file, and if either the application program process of the request is not mapped in the list of processes to the particular file or the user is not authorized access to the data of the particular file, denying the access request;

decrypting, responsive to determining that the application program process of the request is mapped in the list of processes to the particular file and determining that the user is also authorized access to the data of the particular file, with the access control and encryption module, the unique encryption key for the particular file; and outputting, with the access control and encryption module, the decrypted particular file to the user.

2. The method of claim 1, wherein one or more files of the virtual file system are listed in multiple application containers.

3. The method of claim 1, wherein accessing the virtual file system includes communicating with the resource management module via a gateway module.

4. The method of claim 3, wherein the resource management module is a kernel of an operating system.

5. The method of claim 4, wherein the resource management module is the kernel of a Linux operating system.

6. The method of claim 5, wherein the gateway module is a file system in user space (FUSE) module.

7. The method of claim 6, wherein the access control and encryption module is an intrusion detection and prevention module.

8. The method of claim 1, wherein each of the plurality of application containers includes a respective set of rules.

9. The method of claim 8, wherein one or more rules of the set of rules impedes a privileged user from accessing the virtual files listed in the application containers.

10. The method of claim 9, wherein the privileged user is a root user.

11. The method of claim 1 wherein the list of processes indicate processes allowed to access the listed virtual files.

12. The method of claim 1, wherein the access control and encryption module generates a volume key that is global to the virtual file system.

13. The method of claim 12, including encrypting, with the volume key of access control and encryption module, names of the files of virtual file system.

14. The method of claim 13, including generating, with the access control and encryption module, a plurality of application keys each associated with a respective application container.

15. A system for providing access control and file encryption for a file system, the system comprising:

at least one processor; and
at least one memory coupled to the at least one processor, the at least one memory having stored therein instructions which, when executed by any set of the at least one processors, perform a process including:
managing, with a resource management module of a computing system, a storage container including data, the storage container being configured to ensure that a managed file system of the storage container is able to launch on a second computing entity after having been removed from a first computing entity;

hosting, with the resource management module, a virtual file system including a plurality of files representing the data on the storage container;

accessing, with an access control and encryption module of the computing system, the virtual file system;

generating, with the access control and encryption module, a plurality of application containers, including individual application containers for each respective user and including a list of files of the virtual file system and a list of processes authorized for each respective user, the list of files of the virtual file system further mapping one or more specific files to authorized processes authorized to access the one or more specific files, wherein each application container only has access to encryption keys for files stored therein and each user only has access to files of the application container, and only processes, programs, applications and other executables listed in a process list of the application container are allowed to access files of the application container;

creating an access control scenario wherein access to the plurality of application containers is governed by an agent whereas all real data is written directly to the virtual file system, the agent depending on a user-defined policy including access-control entities and rules denying access to root users;

encrypting, with the access control and encryption module, each of the files of the virtual file system with a respective unique randomly-generated file encryption keys specific to individual files, wherein there is a one-to-one correspondence between the respective unique randomly-generated file encryption keys and files in the virtual file system;

encrypting the respective unique randomly-generated file encryption keys; receiving, with the access control and encryption module, a request from an application program process of a user to access data within a selected particular file in the virtual file system;

determining whether the application program process of the request is mapped in a list of processes to the selected particular file, and if so, further determining whether the user is also authorized access to the data of the selected particular file, and if either the application program process of the request is not mapped in the list of processes to the selected particular file or the user is not authorized access to the data of the selected particular file, denying the access request;

denying, with the access control and encryption module, the request if the selected particular file is not listed in the application container associated with the user;

decrypting, responsive to determining that the application program process of the request is mapped in the list of processes to the particular file and determining that the user is also authorized access to the data of the selected particular file, with the access control and encryption module, the unique encryption key for the particular file and the selected particular file if the selected file is listed in the container application associated with the user; and outputting, with the access control and encryption module, the selected decrypted particular file to the user after decrypting the selected file.

16. The system of claim 15, wherein one or more files of the virtual file system are listed in multiple application containers.

17. The system of claim 15, wherein accessing the virtual file system includes communicating with the resource management module via a gateway module.

18. The system of claim 17, wherein the resource management module is a kernel of an operating system.

19. The system of claim 18, wherein the resource management module is the kernel of a Linux operating system.

20. The system of claim 19, wherein the gateway module is a file system in user space (FUSE) module.

21. The system of claim 20, wherein the access control and encryption module is an intrusion detection and prevention module.

22. The system of claim 15, wherein each application container of the plurality of application containers includes a respective set of rules.

23. The system of claim 22, wherein one or more of the rules impedes a privileged user from accessing the files listed in the plurality of application containers.

24. The system of claim 23, wherein the privileged user is a root user.

25. The system of claim 15, wherein the access control and encryption module generates a volume key that is global to the virtual file system.

26. The system of claim 25, including encrypting, with the volume key of access control and encryption module, names of the files of virtual file system.

27. The system of claim 26, including generating, with the access control and encryption module, a plurality of application keys each associated with a respective application container.

28. A method comprising:
establishing a storage container, the storage container including data, the storage container being configured to ensure that a managed file system of the storage container is able to launch on a second computing entity after having been removed from a first computing entity, the resource management module being a component of a kernel of an operating system of the computing system; establishing a virtual file system, the virtual file system including a plurality of files, files of the plurality of files representing subsets of the data in the storage container;
defining two or more application containers, each of the application containers including a mapping list of authorized application processes mapped to individual sets of one or more files of the plurality of files in the virtual file system, wherein each application container only has access to encryption keys for files stored therein and each user only has access to files of the application container, and only processes, programs, applications and other executables listed in a process list of the application container are allowed to access files of the application container;
for each application container, defining privileged user access rules, the privileged user access rules controlling access to files in that application container by privileged users;
generating privileged user access rules data representing the defined privileged user access rules;
for each application container, assigning an encryption key specific to that application container;
for each file associated with an application container, assigning a file encryption key specific to that file;
for each file encryption key, generating file encryption key data representing the file encryption key;
encrypting the file encryption key data for each file;
for each application container, encrypting each of the files of the virtual file system associated with that application container with the specific file encryption key data representing the file encryption key specific to that file, each file being encrypted by its own unique encryption key;
receiving a request for access to data in a virtual file by a user; determining a process associated with the request for access to data in a virtual file by the user;
determining that the process is specifically mapped to the virtual file;
accessing, responsive to the determination that the application process is mapped to the virtual file, the privileged user access rules data and determining, according to the privileged user access rules data, that the user is authorized to access to the requested virtual file;
decrypting, responsive to the determination that the application process is mapped to the virtual file and also responsive to a determination that the user is authorized to access the requested virtual file, the specific file encryption key data for the virtual file containing the requested data; and
responsive to decrypting the specific file encryption key data, decrypting, using the decrypted specific file encryption key data to decrypt the requested data, and providing the user access to the decrypted requested data.

29. The method of claim 28, wherein one or more files of the virtual file system are associated with multiple application containers.

30. The method of claim 28, including accessing the virtual file by communicating with a resource management module of a computing system via a gateway module of a computing system.

31. The method of claim 30, wherein the resource management module is a kernel of an operating system.

32. The method of claim 31, wherein the resource management module is the kernel of a Linux operating system.

33. The method of claim 32, wherein the gateway module is a file system in user space (FUSE) module of a computing system.

34. The method of claim 30, including hosting the application containers with an access control and encryption module of a computing system.

35. The method of claim 34, wherein the access control and encryption module is an intrusion detection and prevention module.

36. The method of claim 28, wherein one or more of the privileged user access rules impedes privileged users from accessing the files listed in the application containers.

37. The method of claim 36, wherein privileged users are root users.

38. The method of claim 28, including generating volume key data representing a volume key that is global to the virtual file system.

39. The method of claim 38, including encrypting, with the volume key data, names of the files of virtual file system.

* * * * *